No. 780,668. PATENTED JAN. 24, 1905.
L. KISSLING.
AUTOMATICALLY ADJUSTING PIPE OR LIKE CUTTER.
APPLICATION FILED MAR. 4, 1904.

Witnesses:
Inventor
Ludwig Kissling
By Wm. E. Boulter
Attorney

No. 780,668. Patented January 24, 1905.

UNITED STATES PATENT OFFICE.

LUDWIG KISSLING, OF REMSCHEID, GERMANY.

AUTOMATICALLY-ADJUSTING PIPE OR LIKE CUTTER.

SPECIFICATION forming part of Letters Patent No. 780,668, dated January 24, 1905.

Application filed March 4, 1904. Serial No. 196,598.

*To all whom it may concern:*

Be it known that I, LUDWIG KISSLING, a subject of the King of Prussia, Emperor of Germany, residing at Remscheid, Prussia, Empire of Germany, have invented certain new and useful Improvements in or Relating to Automatically-Adjusting Pipe or Like Cutters, of which the following is a specification.

This invention relates to improvements in cutters for pipes and the like, and comprises three cutting-disks of the well-known kind and is characterized by the movement or adjustment of the lower disk being effected automatically.

Two constructions of the apparatus according to the present invention are illustrated by way of example in the accompanying drawings, in which—

Figure 1:
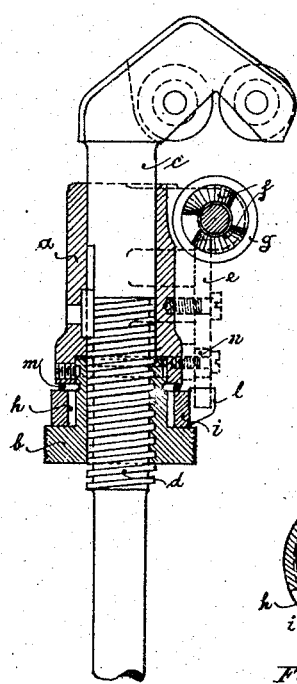
Figure 2:
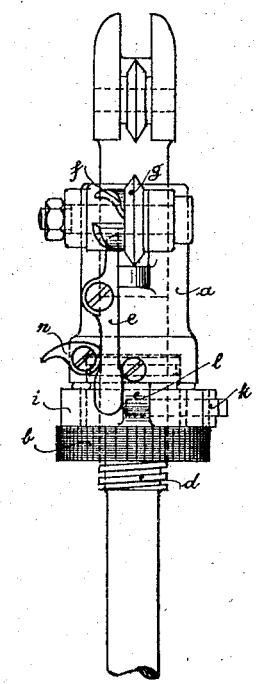
Figure 3:
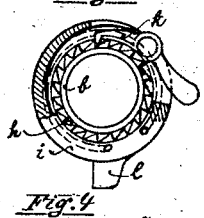
Figure 4:
Figure 5:
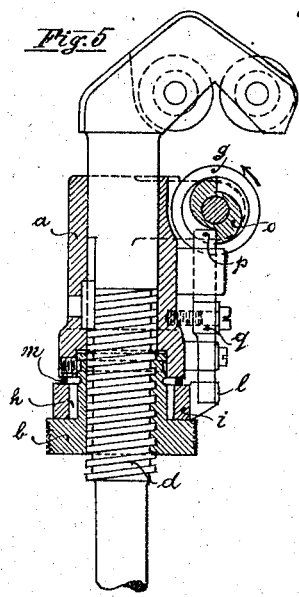
Figure 6:
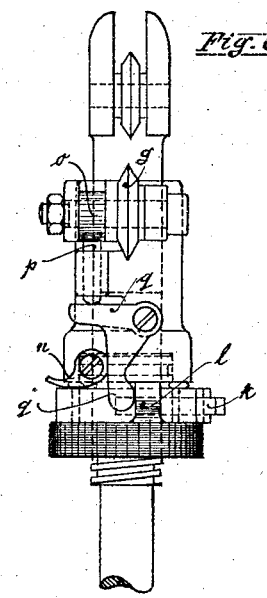

Figure 1 shows the pipe-cutter in side elevation, partly in section, and Fig. 2 in front elevation. Fig. 3 is a plan view of the screw-threaded nut with the ratchet-ring. Fig. 4 shows the spring between the nut and the slide. Figs. 5 and 6 show another construction of the apparatus in side and front elevation.

A sleeve *a* and nut *b*, connected to it, move in both constructions on the upper part of a rod *c* and the screw-threaded portion *d* thereof. In the construction illustrated in Figs. 1 and 2 the movement of the sliding sleeve *a* by the turning of the nut is effected by means of a pivoted lever *e*, mounted on the sleeve *a* and actuated by a cam-groove *f* on the shaft of the lower cutter-disk *g*. On the reduced part *h* of the nut *b*, formed into a kind of ratchet-wheel, is placed a ring *i*, carrying a pawl *k* and provided with a projecting lug *l* for the lever *e*. Owing to the rotation of the cutter-disk *g* and of the cam-groove *f* the lever is intermittently rocked in such way that its lower end presses against the lug *l* of the ring *i* and slightly turns the latter, the pawl *k*, mounted on the ring and acted upon by a spring, causing the nut to rotate through its ratchet-teeth. After the lever has completed its stroke and the cam-groove *f* allows the lever *e* to return, the ring *i* springs back, the pawl sliding over the teeth. This return movement is effected by the action of a spring-ring *m*, Fig. 4, arranged between the sleeve and the ring *i* and suitably secured to both these parts. The pawl is so arranged that it can be at will thrown out of gear in order to enable the nut and the sleeve to be moved by hand. In order to enable the rate of advance of the cutter or the travel of the lever *e* to be adjusted whenever this may be desired, there is arranged a stop *n*, provided with a cam-surface so arranged that said surface can be set as desired relatively to the part *e*, against which it bears, so as to limit the return movement of the lever *e*.

The construction shown in Figs. 5 and 6 only differs from the one described in the arrangement of the parts for effecting the transmission of movement from the lower disk, while the manner of working remains the same. Instead of the cam-groove *f* on the lower cutter-disk a double cam *o* is provided, which on depressing a pin *p*, adjustably mounted on the sleeve, actuates a bell-crank lever *q*, the lower arm of which acts on the lug *l* of the ring *i*. The adjustable stop *n* for regulating the travel of the lever *e* is retained in this construction as before, as is also the spring-ring *m*, mounted between the sleeve and the ring *i*.

What I claim as my invention, and desire to secure by Letters Patent, is—

1. An automatically-adjusting pipe-cutter comprising a plurality of cutter-disks, a cam on the shaft of the lower adjustable cutter, lever mechanism operated by said cam, a ratchet-ring operated by said lever and a longitudinally-movable nut for adjusting the cutter-carrier substantially as set forth.

2. An automatically-adjusting pipe-cutter comprising a plurality of cutter-disks, a cam on the shaft of the lower, adjustable cutter-disk, a lever engaging with said cam and pivoted on a longitudinally-movable sleeve carrying said cutter-disk and a ratchet-ring operated by said lever, a nut engaged by said ratchet-ring and mounted below the movable sleeve, substantially as set forth.

3. An automatically-adjusting pipe-cutter comprising a plurality of cutter-disks, a cam on the shaft of the lower adjustable cutter-disk, a lever engaging with said cam and pivoted on a longitudinally-movable sleeve carrying said cutter-disk, a ratchet-ring, a lug on said ring, and a rotatable cam-stop therefor, substantially as set forth.

4. An automatically-adjusting pipe-cutter comprising a plurality of cutter-disks, a cam on the shaft of the lower adjustable cutter-disk, a lever engaging with said cam and pivoted on a longitudinally-movable sleeve carrying said cutter-disk, a ratchet-ring, a lug on said ring, a rotatable cam-stop and a spring between the ratchet-ring and the sliding sleeve substantially as set forth.

5. A pipe-cutter comprising a rotatory cutter-bearing shaft, an adjustable nut thereon, a longitudinally-adjustable sleeve thereon, a rotatory cutter mounted on said sleeve, a cam on the shaft of said cutter, a lever pivoted on said sleeve and engaging said cam, a ratchet-ring operated by said lever, and engaging external teeth on the nut, substantially as set forth.

In testimony whereof I have signed my name to this specification in the presence of two subscribing witnesses.

LUDWIG KISSLING.

Witnesses:
WILH. KOTTBOUS,
VICTOR W. HELDT.